(12) United States Patent
Yabe et al.

(10) Patent No.: US 11,964,417 B2
(45) Date of Patent: Apr. 23, 2024

(54) MELT PROCESSIBLE FLUORORESIN MOLDED ARTICLE

(71) Applicant: CHEMOURS-MITSUI FLUOROPRODUCTS CO., LTD., Tokyo (JP)

(72) Inventors: Hiromasa Yabe, Shizuoka (JP); Takahiro Nishimura, Shizuoka (JP)

(73) Assignee: CHEMOURS-MITSUI FLUOROPRODUCTS CO., LTD., Tokyo (JP)

( * ) Notice: Subject to any disclaimer, the term of this patent is extended or adjusted under 35 U.S.C. 154(b) by 546 days.

(21) Appl. No.: 16/623,973

(22) PCT Filed: Jun. 22, 2018

(86) PCT No.: PCT/US2018/039055
§ 371 (c)(1),
(2) Date: Dec. 18, 2019

(87) PCT Pub. No.: WO2018/237297
PCT Pub. Date: Nov. 27, 2018

(65) Prior Publication Data
US 2020/0139604 A1    May 7, 2020

(30) Foreign Application Priority Data

Jun. 23, 2017 (JP) ................................. 2017-123485
Jun. 5, 2018 (JP) ................................. 2018-107956

(51) Int. Cl.
| | |
|---|---|
| *B29C 48/00* | (2019.01) |
| *B29C 48/07* | (2019.01) |
| *C08L 27/14* | (2006.01) |
| *C08L 27/16* | (2006.01) |
| *C08L 27/18* | (2006.01) |
| *C08L 27/20* | (2006.01) |
| *B29K 27/00* | (2006.01) |
| *B29K 27/18* | (2006.01) |

(52) U.S. Cl.
CPC ............ *B29C 48/022* (2019.02); *B29C 48/07* (2019.02); *C08L 27/14* (2013.01); *C08L 27/16* (2013.01); *C08L 27/18* (2013.01); *C08L 27/20* (2013.01); *B29K 2027/14* (2013.01); *B29K 2027/16* (2013.01); *B29K 2027/18* (2013.01)

(58) Field of Classification Search
CPC ................................................... B29C 48/022
See application file for complete search history.

(56) References Cited

U.S. PATENT DOCUMENTS

| | | | | |
|---|---|---|---|---|
| 3,287,802 | A | * | 11/1966 | Hill .......................... F16L 33/34 29/516 |
| 4,255,247 | A | † | 3/1981 | Oda |
| 4,657,805 | A | * | 4/1987 | Fukumitsu .............. B32B 27/08 428/215 |
| 4,743,658 | A | | 5/1988 | Imbalzano et al. |
| 6,663,722 | B1 | * | 12/2003 | Higashino ................. B08B 3/04 134/28 |
| 6,921,797 | B2 | * | 7/2005 | Tanaka ................... C08F 214/26 526/78 |
| 8,399,713 | B2 | | 3/2013 | Bartelt et al. |
| 11,267,209 | B2 | * | 3/2022 | Nishimura .............. B29C 71/02 |
| 2002/0098371 | A1 | * | 7/2002 | Higuchi ................ B32B 27/365 526/348.1 |
| 2003/0121533 | A1 | * | 7/2003 | Bottos ............... H01L 21/67313 211/41.18 |
| 2004/0160657 | A1 | † | 8/2004 | Tonar |
| 2004/0232584 | A1 | | 11/2004 | Johnson |
| 2005/0107535 | A1 | * | 5/2005 | Funaki ................... C08F 214/18 525/191 |
| 2010/0068325 | A1 | * | 3/2010 | Chou ..................... B29C 43/36 425/410 |

(Continued)

FOREIGN PATENT DOCUMENTS

| | | |
|---|---|---|
| EP | 0220910 A2 | 5/1987 |
| EP | 0338755 A2 | 10/1989 |

(Continued)

OTHER PUBLICATIONS

Malvern, Determination of the zeta potential of the surface of PTFE (Year: 2016).*
Super PFA Tube, Teflon PFA 451 HP-J (Year: NA).*
Eshima, "2. Injection molding process of fluororesin", Plastics Age Encyclopedia Progressive Edition, pp. 182-190 (2006).
"ICP-OES and ICP-MS Detection Limit Guidelines", Evans Analytical Group, 2 pages (2007).

(Continued)

*Primary Examiner* — Irina Krylova
(74) *Attorney, Agent, or Firm* — McNees Wallace & Nurick LLC (57) ABSTRACT

Provided is a melt processible fluororesin molded article with reduced metal ions after molding (eluted metal ions) and submicron size fine particles. The melt processible fluororesin molded article has an amount of eluted Ni ions (in pg/cm$^2$) and amount of eluted Cr ions (in pg/cm$^2$) and amount of eluted Mo ions (in pg/cm$^2$) in a test solution after eluting for 20 hours at 60° C. using 12% nitric acid, quantitatively analyzed by the ICP (induced coupled plasma) mass analysis method, satisfy the following formula:

$$0.5 \leq 1-[(M_1+M_2)/(M_1+M_2+M_3)]<1,$$

wherein $M_1$ refers to the eluted Cr ion amount (in pg/cm$^2$), $M_2$ refers to the eluted Mo ion amount (in (Continued)

pg/cm$^2$), and M$_3$ refers to the eluted Ni ion amount (in pg/cm$^2$).

14 Claims, 3 Drawing Sheets

(56) References Cited

U.S. PATENT DOCUMENTS

| | | | |
|---|---|---|---|
| 2011/0236691 A1* | 9/2011 | Fukumoto | B29C 65/66 428/421 |
| 2013/0046058 A1 | 2/2013 | Pham | |
| 2021/0003953 A1* | 1/2021 | Miyauchi | G03G 15/162 |

FOREIGN PATENT DOCUMENTS

| | | | |
|---|---|---|---|
| EP | 1162212 A1 | | 12/2001 |
| EP | 1178058 A1 | | 2/2002 |
| EP | 2418227 A1 | | 2/2012 |
| JP | 2007500853 A | | 1/2007 |
| JP | 2009269220 A | † | 11/2009 |
| JP | 2012-518010 A | | 8/2012 |
| JP | 2017052854 A | † | 3/2017 |
| WO | WO 2016/106125 | * | 6/2016 |

OTHER PUBLICATIONS

Japan Fluoropolymer Industry Association et al., ed., "Fluoropolymer Handbook", Revised Edition 12, Japan Fluoropolymer Industry Association, pp. 1-160 (2011).
Nham, "Typical detection limits for an ICP-MS", American Laboratory, 3 pages (1998).
Latest Trends for Semiconductor Cleaning Technology, Semiconductor FPD World 2009.9, Hattori, Takashi.
Fluororesin Hand Book, Revised 13th Edition, JFIA Japan Fluororesin Industry Association, pp. 62, 63, 124.
Metal Data Book, edited by Japan Metal Society, revised 4th edition, p. 150.
Kitchen and Bath Industry Association Report No. 55 (Apr. 1999 issue).
Ihara et al., "High quality PFA for semiconductors", Valqua Review, Mar. 1991, vol. 35, No. 3, pp. 1 to 6, ISSN: 0385-6925.†
Satokawa, "Fluoropolymer Handbook", Nikkan Kogyo Shimbunsha, Nov. 1990, pp. 285 and 299.†
Chemours Mitsui Fluoroproducts Co Ltd., "DuPont TM Teflon (R) Fluoropolymer Handbook for Practical Use", Jul. 2011, pp. 1, 11, 19, 80, 82, 83, 84 and 92.†

\* cited by examiner
† cited by third party

MELT PROCESSIBLE FLUORORESIN MOLDED ARTICLE

CROSS-REFERENCE TO RELATED APPLICATIONS

This application claims priority to the following applications: Japanese patent application no. JP 2018-107956, filed Jun. 5, 2018 (Reference No. AP377(p)); and Japanese patent application no. JP 2017-123485, filed Jun. 23, 2017 (Reference No. AP377), the disclosure of which are incorporated herein by reference in their entirety.

This application represents a national filing under 35 U.S.C. 371 of International Application No. PCT/US2018/039055 filed Jun. 22, 2018, and claims priority of Japanese Patent Application No. 2017-123485 filed Jun. 23, 2017 and Japanese Patent Application No. 2018-107956 filed Jun. 5, 2018, the disclosures of which are incorporated herein by reference in their entirety.

TECHNICAL FIELD

The present invention relates to a melt processable fluororesin molded article with reduced metal ions (eluted metal ions) and fine particles. More specifically, the present invention relates to a melt processable fluororesin molded article with reduced metal ions (eluted metal ions) and submicron size fine particles, used in molded articles for liquid transfer and/or molded articles for liquid contact, that are used in semiconductor manufacturing equipment.

BACKGROUND

Fluororesins exhibit excellent properties such as heat resistance, chemical resistance, high frequency electrical properties, nonadherent properties, flame resistance, and the like, and therefore are widely used in transportation piping for chemicals such as acids, alkali, or the like, solvents, paint, and the like, chemical industrial manufacturing articles such as chemical storing containers, tanks, or the like, and electric industrial articles such as tubes, rollers, electric wires, and the like. In particular, melt processable fluororesin molded articles are frequently used in semiconductor manufacturing equipment due to these properties.

In the field of semiconductor manufacturing, as miniaturization, densification, high integration, and wire multilayering of circuit patterns for semiconductor devices continue to advance, the manufacturing process will also become more complicated and the number of processes will also continue to increase. As a result of demand for miniaturization, the size that is considered a defect in circuit patterns of semiconductor devices is becoming even smaller. Therefore, there have been cases in which a material, a member, or a process itself used for the semiconductor manufacturing device is the contamination source, and in addition to chemical contaminants at semiconductor manufacturing sites, minute (minuscule amount) contaminants such as metal ions (eluted metal ions), fine particles, or the like have increasingly affected the yield rate and reliability of semiconductor manufacturing (non-patent literature 1). Consequently, in order to suppress the occurrence of defects in circuit patterns of minute semiconductor devices, purification of materials, members, and processes used for semiconductor manufacturing devices has become increasingly important, and for example, patent literature 1 suggests cleaning methods or the like using cleaning compositions containing unsaturated fluorocarbon ethers for members.

Molding methods such as extrusion molding methods, injection molding methods, transfer molding methods, rotational molding methods, blow molding methods, and compression molding methods performed using general thermoplastic resins can be applied when melt molding molded articles using melt processible fluororesin. However, molding machines that come in contact with melted fluororesin are made of alloys such as Hastelloy and Inconel, which are so-called Ni (nickel) based heat and corrosion resistant alloys, because compared to general thermoplastic resin, molten fluororesin can easily corrode metals and alloys that configure molding machines (non-patent literature 2).

These alloys have Ni as a main component, which is corrosion resistant, and also have a composition containing Cr (Chromium) and Mo (Molybdenum) for preserving and maintaining the corrosion resistant properties (non-patent literature 3). The Ni based heat and corrosion resistant alloys themselves do not have phase transformation temperatures in a range between room temperature to 450° C., and display high corrosion resistance in a thin, uniform passivation state with high Cr density formed on a surface of the Ni based heat and corrosion resistant alloy, and the Mo in the alloy has a function for repairing the passivation state (non-patent literature 4).

When melt molding, the melt processible fluororesin itself or an unstable end group of the fluororesin can be thermally decomposed, and will generate fluororesin decomposition matter in the form of a gas containing fluorine (non-patent literature 2). Even if a molding machine is made from a Ni based heat and corrosion resistant alloy, elements contained in the alloy (e.g., Ni, Cr, Mo) will be mixed with the melted melt processible fluororesin in the form of metal ions as a result of this gas containing fluororesin decomposition matter, thereby destroying the passivation state formed on the surface in the molding machine, or on the surfaces of the cylinder and screw in the melt molding machine, corroding up to the corrosion resistant alloy internal part. As a result, the metal ions will remain in the melt processible fluororesin in the form of the final molded article. These metal ions are eluted from the melt processible fluororesin molded article as metal ions during the semiconductor manufacturing process, and since these metal ions provide a corroding and/or etching effect on the semiconductor device during manufacturing and are the cause of device breakdowns, reduction of metal ions in melt processible fluororesin molded articles is strongly desired.

As a method for resolving the aforementioned problem, terminal group amidation methods of fluororesin, terminal group fluorination methods of fluororesin, and the like have been suggested. A method that converts all of the thermally unstable terminal groups into—$CF_3$ terminal groups, which are thermally stable terminal groups, by processing fluororesin using fluorine gas (referred to as fluorination method below), and suppresses the release of fluororesin decomposition matter generated by hydrolysis and pyrolysis is mentioned in the patent literature 2 as a method for thermal stabilization using an amide group. However, the problem of the passivation state formed on the surface in the molded machine could not be resolved since the melt processible fluororesin itself will thermally decompose to a small degree and generate fluorine ions when melt molding, even if the fluorination processed fluororesin (raw material) did not contain any thermally unstable terminal/end groups.

Furthermore, fine particles derived from cooled and solidified gaseous fluororesin decomposition matter may adhere to the surface of the melt processible fluororesin molded article. These fine particles accompany chemical solutions that wet the fluororesin molded article, and may be the cause of defects that lead to defective products when adhering to a wafer surface, but efficiently removing submicron size fine particles is not easy.

Normally, cleaning methods for melt processible fluororesin used during semiconductor manufacturing are performed using a diluted aqueous solution of a surfactant, strong acid, alkali, organic solvent, ultrapure water, or the like, but not only do these methods require a long period of time for cleaning, but reaching a level of cleanliness that satisfies the demand required for melt processible fluororesin molded articles used in semiconductor manufacturing devices is difficult.

SUMMARY

Problem to be Solved by the Invention

In light of the foregoing, the present inventors focused on the point that even though it is important to determine whether or not the elements that comprise a passivation state in alloys that are used in molding machines for melt molding the aforementioned melt processible fluororesins are present in the fluororesin molded article, and in particular whether or not the molding process of the fluororesin molded article is sound, and even though Cr and Ni are included in the requirements for metal contamination specified in SEMI F57, there is no requirement for Mo. In order to resolve the aforementioned problem, the present inventors discovered a melt processible fluororesin molded article with reduced metal ions and fine particles, and thus achieved the present invention.

Therefore, an object of the present invention is to provide a melt processible fluororesin molded article with reduced metal ions after molding and submicron size fine particles.

Another object of the present invention is to provide a melt processible fluororesin molded article with reduced metal ions and submicron size fine particles, without a long cleaning process using a dilute solution of a surfactant, strong acid, alkali, organic solvent, ultrapure water, and the like.

Means for Solving the Problem

The present invention provides a melt processible fluororesin molded article, wherein the amount of eluted Ni ions (pg/cm$^2$), the amount of eluted Cr ions (pg/cm$^2$) and the amount of eluted Mo ions (pg/cm$^2$) in a test solution after eluting for 20 hours at 60° C. using 12% nitric acid, quantitatively analyzed by the ICP (induced coupled plasma) mass analysis method, satisfy the following formula (1):

$$0.5 \leq 1-[(M_1+M_2)/(M_1+M_2+M_3)] < 1 \quad (1)$$

wherein $M_1$ indicates the eluted Cr ion amount, $M_2$ refers to the eluted Mo ion amount, and $M_3$ refers to the eluted Ni ion amount, all such amounts in pg/cm$^2$. Incidentally, if Ni, Cr, and Mo ions are not detected at or below the lower limit of detection, the calculation is performed using the lower limit of detection.

With the melt processible fluororesin molded article of the present invention:

(1) in one embodiment, the amount of eluted Mo ions in the test solution after eluting for 20 hours at 60° C. using 12% nitric acid, and quantitatively analyzed by ICP (induced coupled plasma) mass analysis method is 250 pg/cm$^2$ or less;

(2) in one embodiment anions and cations are not detected by any of ion chromatography, ICP mass analysis methods, and TOF-SIMS methods;

(3) in one embodiment, fine particles measured in accordance with the fine particles in a liquid measurement method are contained at an amount of from 0 to 5000 particles/mL, as the sum of measurements for 1 hour;

(4) in one embodiment, the zeta potential of the surface of the melt processible fluororesin molded article measured by the flow potential method is −50 mV or lower;

(5) in one embodiment, the zeta potential measured by the flow potential method of the melt processible fluororesin is −50 mV or lower;

(6) in one embodiment, the melt processible fluororesin is a melt processible fluororesin having a melt flow rate (MFR) of 1 to 100 g/10 minutes when measured with a load of 5 kg at a measurement temperature of 372±0.1° C., in accordance with ASTM D 1238;

(7) in one embodiment, the melt processible fluororesin is at least one type selected from copolymers of tetrafluoroethylene (TFE) and at least one monomer selected from hexafluoropropylene (HFP), chlorotrifluoroethylene (CTFE), perfluoro(alkylvinyl ether) (PAVE), vinylidene fluoride (VDF), and vinyl fluoride (VF);

(8) in one embodiment, the melt processible fluororesin is a copolymer (PFA) of tetrafluoroethylene (TFE) and perfluoro(alkylvinyl ether) (PAVE), and is a copolymer where the amount of PAVE is 1 to 10 mol %;

(9) in one embodiment, the melt processible fluororesin is a copolymer of tetrafluoroethylene (TFE) and hexafluoropropylene (HFP), and is a copolymer (FEP) where the amount of HFP is 1 to 10 mol %;

(10) in one embodiment, the melt processible fluororesin molded article is a melt processible fluororesin molded article having transmittance of 50% T or more at a wavelength of 240-800 nm;

(11) in one embodiment, the melt processible fluororesin molded article is a melt processible fluororesin molded article having transmittance of 60% T or more at a wavelength of 240-800 nm;

(12) in one embodiment, the melt processible fluororesin molded article is a melt processible fluororesin molded article having transmittance of 75% T or more at a wavelength of 240-800 nm; and, (13) in one embodiment, the melt processible fluororesin molded article is a molded article selected from tubes, pipes, bottles, fittings, gaskets, O-rings, valves, filter housings, regulators, wafer carriers, and sheet molded articles.

Effect of the Invention

The present invention provides a melt processible fluororesin molded article with reduced metal ions and submicron size fine particles.

The fact that the present invention can reduce metal ions and submicron size fine particles, without a long cleaning process of the molded article after molding, using a dilute solution of a surfactant, strong acid, alkali, organic solvent, ultrapure water, and the like is a particularly excellent effect that was unexpected based on the background technology.

DETAILED DESCRIPTION

An important characteristic of the melt processable fluororesin molded article of the present invention is that the amount of eluted Ni ions (in pg/cm$^2$), the amount of eluted Cr ions (in pg/cm$^2$), and the amount of eluted Mo ions (in pg/cm$^2$) in a test solution after eluting for 20 hours at 60° C. using 12% nitric acid, quantitatively analyzed by the ICP (induced coupled plasma) mass analysis method satisfy the following formula (1):

$$0.5 \leq 1-[(M_1+M_2)/(M_1+M_2+M_3)]<1 \qquad (1)$$

wherein $M_1$ indicates the eluted Cr ion amount (in pg/cm$^2$), $M_2$ refers to the eluted Mo ion amount (in pg/cm$^2$), and $M_3$ refers to the eluted Ni ion amount (in pg/cm$_2$). Incidentally, if Ni, Cr, and Mo ions are not detected at or below the lower limit of detection, the calculation is performed using the lower limit of detection.

As described above, the amount of metal ions and submicron size particles is reduced without performing special cleaning.

Eluted Metal Ions

As described above, molding machines made of Ni based heat resistant and corrosion resistant alloys containing Ni as a main component and also containing Cr and Mo are generally used for melt molding melt processable fluororesin, and a thin uniform passivation state with high Cr density is formed on the surface that contacts the melt processable fluororesin (surface of the Ni based heat resistant and corrosion resistant alloy). When the passivation state is destroyed by halogen ions such as chlorine ions, fluorine ions, and the like, the Cr ions will elute, but Mo has a function of restoring the passivation state. Mo in the parent material diffuses to the surface at the same time that the passivation state is destroyed. Thus, the Cr defect parts of the passivation state are replaced and the passivation state is restored. But if corrosion continues to proceed, the restoration by Mo will not keep up, and the Mo will also elute in addition to the Cr. Therefore, when the passivation state of the Ni based heat resistant and corrosion resistant alloy is destroyed by halogen ions, a large amount of Cr and Mo will be present in the molding machine, and a large amount of these elements will be incorporated into the melt processable fluororesin molded article during melt molding. Therefore, the degree of breakdown of the passivation state (passivation state section rate) of the molding machine can be determined by the value calculated in the aforementioned formula (1).

With the present invention, the amount of eluted Cr ions, the amount of eluted Mo ions, and the amount of eluted Ni ions that elute from the melt processable fluororesin molded article are measured, and if the amounts satisfy the aforementioned formula (1), or in other words, if the value calculated by the aforementioned formula (1) is 0.5 or higher and less than 1, the condition where the passivation state can easily be restored if destroyed is indicated (i.e., high passivation state protection rate). It is understood that in this condition, the corrosion resistance of the Ni based heat resistant and corrosion resistant alloy that is used in the molding machine is sound, and the result is that a melt processable fluororesin molded article with reduced eluted metal ions can be obtained.

Incidentally, a value of 1 in the aforementioned formula (1) indicates that the passivation state is not destroyed at all. On the other hand, if the value calculated by the aforementioned formula (1) is less than 0.5, breakdown of the passivation state will proceed, and the corrosion resistance of the Ni based heat resistant and corrosion resistant alloy that forms the molding machine will be significantly lost. In this state, corrosion of the corrosion resistant alloy that forms the molding machine will proceed, the concentration of Cr, Mo, and Ni, which is the main component, will increase in the melt processable fluororesin molded article, and in addition, the concentration of other additive elements that are included as additive elements in the corrosion resistant alloy, such as W (tungsten), Nb (niobium), Fe (iron), and the like, will also increase, which is not preferable.

The amount of eluted Mo ions in the present invention is preferably 250 pg/cm$^2$ or less, and particularly preferably 200 pg/cm$^2$ or less when quantitatively analyzed by ICP mass analysis methods. If the amount of eluted Mo ions of the Mo that has a passivation state restoring function exceeds 250 pg/cm$^2$, destruction of the passivation state will clearly proceed, which is not preferable.

Anions and Cations

Anions and cations are preferably not detected by any one of ion chromatography, ICP mass analysis methods, and TOF-SIMS (time of flight-secondary ion mass spectrometry) methods, and if anions or cations are detected by any of these methods, this is an indication that the melt processable fluororesin molded article was washed using a cleaning medium containing any of acid, alkali, surfactant, or organic solvent, and the degree to which anions and cations are detected by the aforementioned analysis methods indicates a condition where the cleaning medium remains in the melt processable fluororesin molded article, which is not preferable.

Therefore, a state where metal ions and fine particles are reduced, anions and cations are not detected by any of the aforementioned methods, and where the cleaning medium does not remain with the melt processable fluororesin molded article is a particularly preferable state for the melt processable fluororesin molded article.

Incidentally, the phrase "anions and cations are not detected by any of ion chromatography, ICP mass analysis methods, and TOF-SIMS methods" has the following meanings:

With the ion chromatography method, a condition is indicated where the concentration of anions and cations determined by quantitative analysis using ion chromatography in accordance with JIS K 1027 is above the detectable limit for a test solution where the part that contacts the melt processable fluororesin molded article was filled with ultrapure water, elution was performed for 20 hours at 60° C., and it was confirmed that there is not a condition where more ions are detected than the measurement results of the test solution when the part that contacts the melt processable fluororesin molded article is similarly filled with ultrapure water and elution is performed for 10 minutes at room temperature.

With the ICP mass analysis method, a condition is indicated where the concentration of B, Na, P, K, and S cations determined by analysis using ICP mass analysis methods is above the detectable limit for a test solution where the part that contacts the melt processable fluororesin molded article was filled with ultrapure water, elution was performed for 20 hours at 60° C., and it was confirmed that there is not a condition where more ions are detected than the measurement results of the test solution when the part that contacts the melt processible fluororesin molded article is similarly filled with ultrapure water and elution is performed for 10 minutes at room temperature. Incidentally, Na indicates evidence of washing with sodium hydroxide, P indicates washing with phosphoric acid, K indicates washing with potassium hydroxide, S indicates washing with an acid such as sulfuric acid, or washing with an alkali. Also, B represents boron, which is an element from the molding environment that adheres to the fluororesin molded article.

With the TOF-SIMS method, a condition is indicated where the concentration of anions and cations determined by analysis using TOF-SIMS is above the detectable limit for a test solution where the part that contacts the melt processible fluororesin molded article was filled with ultrapure water, elution was performed for 20 hours at 60° C., and it was confirmed that there is not a condition where more ions are detected than the measurement results of the test solution when the part that contacts the melt processible fluororesin molded article is similarly filled with ultrapure water and elution is performed or 10 minutes at room temperature.

Fine Particles

In the present invention, the fine particles that are to be reduced are fine particles where gaseous decomposition products of fluororesin that have adhered to the wetted part surface of the melt processible fluororesin molded article are solidified after cooling. In further detail, these are submicron size fine particles that have adhered to the melt processible fluororesin molded article wetted part side surface, and are fine particles that can cause defects that lead to defective products by collecting on the wafer during the aforementioned semiconductor cleaning process.

Figure 3:
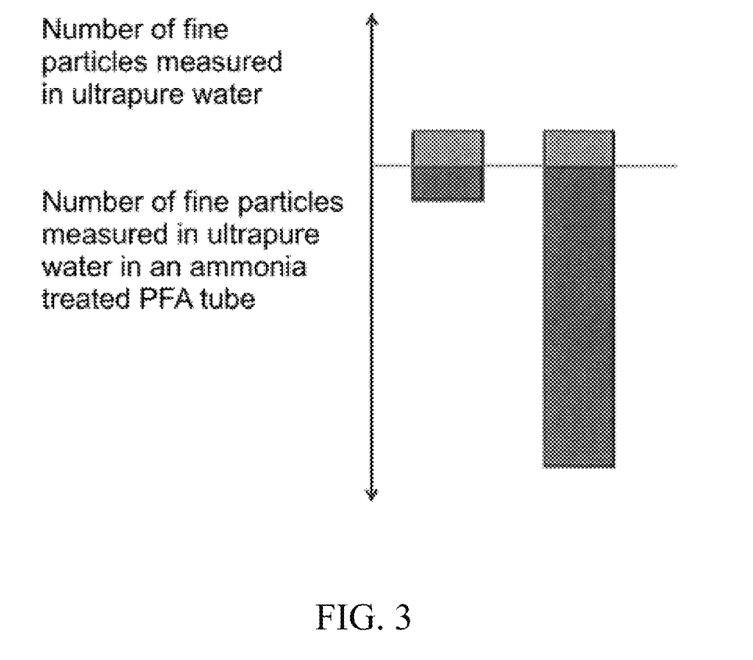
FIG. 3 shows an image diagram of the number of fine particles that adhere to the melt processable fluororesin molded article.

These fine particles do not easily float (peel) away from the surface when using ultrapure water as the solution that wets the wetted part side surface of the melt processible fluororesin molded article, but are in a condition that will float (peel) due to the reactive force of the zeta potential that is described below. Therefore, with the present invention, more fine particles are detected in the test solution by performing accelerated testing using treatment with not only ultrapure water, but also an alkaline aqueous solution (dilute ammonia aqueous solution) as described below, and the number of fine particles that have adhered to the surface of the wetted part can be measured with greater precision (refer to FIG. 3).

The number of fine particles measured by the method described below using ultrapure water as the solution that wets the wetted part side surface after treatment with an alkaline aqueous solution (dilute ammonia aqueous solution) for the melt processible fluororesin molded article of the present invention is 0 to 5000 particles/mL, preferably 0 to 500 particles/mL, and more preferably 0 to 100 particles/mL, as the total measured over 1 hour. A number of ultrafine particles that exceeds 5000 particles/mL indicates that there are a larger number of ultrafine particles that have adhered to the wetted part side surface, and a large number of ultrafine particles have adhered to the wafer surface and are a cause of defects that lead to defective products, which is not preferable.

With the present invention, the adhesion and adsorption of ultrafine particles on the surface of the melt processible fluororesin molded article are evaluated by measuring the zeta potential that is measured by the flow potential method on the surface of the melt processible fluororesin molded article.

The ultrafine particles and ions in the solution are positively or negatively charged. In particular, the ultrafine particles that remain on the wafer during the cleaning process of a semiconductor have a negative charge. Furthermore, the ultrafine particles derived from the melt processible fluororesin molded article also have a negative charge unless the molecular structure is greatly changed.

On the other hand, the melt processible fluororesin molded article and the melt processible fluororesin also have a negative charge. Herein, the charge status of the surface of melt processible fluororesin molded article can be empirically known as a quantitative value by measuring the zeta potential (if necessary, refer to Koberunikusu, Vol. 10. 2001, pages 6 to 8). With the melt processible fluororesin molded article with ultrafine particles having a negative zeta potential and the surface of melt processible fluororesin molded article with a negative zeta potential, the signs for the charge of the zeta potential are the same, so the product of the zeta potentials of both will be large, indicating an increase in the reactive force of static electricity, and thus the ultrafine particles will not readily adhere to the melt processible fluororesin molded article surface. Therefore, a smaller zeta potential of the melt processible fluororesin molded article means that the product of both zeta potentials will be large, so the fine particles formed by cooling and solidifying the gaseous melt processible fluororesin decomposition products (which have a negative zeta potential) generated during heat melting will not readily adsorb, and these fine particles will not adhere to the wetted part of the melt processible fluororesin molded article.

Also, a zeta potential of the melt processible fluororesin is determined by its molecular structure. Therefore, there is a correlation between a zeta potential of the melt processible fluororesin and a zeta potential of the surface of the melt processible fluororesin molded article.

The zeta potential of the surface of the melt processible fluororesin molded article of the present invention is a value that is calculated after measuring the flow current by the flow potential method. The zeta potential of the melt processible fluororesin molded article wetted part side surface measured by the flow potential method of the present invention is −50 mV or lower at pH=7, preferably −60 mV or lower, and more preferably −85 mV or lower, with regard to ultrafine particles with a Zeta potential having a negative sign. If the Zeta potential exceeds −50 mV, the static electric reactive force will be reduced, which is not preferable.

Incidentally, the shape of the molded article that is measured must be flat, but methods for flattening are not limited, and can include cleaving, pressing, melt pressing, melt film forming, and other methods.

Furthermore, the value of the zeta potential indicates the same zeta potential for the melt processible fluororesin raw material (pellet) or for the molded article made from the raw material, so long as there is not a change to the molecular structure or reactions and mixing of other substances. For the case of fluororesin, a larger pH indicates a more negative zeta potential (refer to FIG. 1).

Melt Processible Fluororesin

The melt processible fluororesin that is used with the present invention is a copolymer of tetrafluoroethylene (TFE) and at least one type of fluorine monomer (comonomer) that can copolymerize with TFE and is present in the polymer at a sufficient rate even below the melting point such as 315° C. or lower, where the melting point of the copolymer is essentially lower than the melting point of the TFE homopolymer (polytetrafluoroethylene (PTFE)), and is a copolymer with a melt flow rate (MFR) at 372° C. of approximately 1 to 100 g/10 minutes, in accordance with ASTM D-1238. The melt flow rate (MFR) can be selected based on the molding method, and for example, for the case of melt molding such as melt extrusion molding, injection molding, and the like, the melt flow rate is 1 to 100 g/10 minutes, preferably 1 to 50 g/10 minutes, and more preferably 1 to 20 g/10 minutes.

The copolymer includes copolymers containing at least approximately 40 to 98 mol % of tetrafluoroethylene monomer and approximately 2 to 60 mol % of at least one type of comonomer; and examples of the comonomer include hexafluoropropylene(HFP), perfluoro (alkylvinyl ether) (PAVE) (where the alkyl group is a straight chain or branched alkyl group with 1 to 5 carbon atoms), vinylidene fluoride, vinyl fluoride, or the like. The PAVE can have an alkyl group with 1, 2, 3, or 4 carbon atoms. A copolymer containing a plurality of types of PAVE as the comonomer is also acceptable.

Examples of preferable copolymers include FEP (TFE/HFP copolymer), PFA (TFE/PAVE copolymer), copolymers of TFE/HFP/PAVE where the PAVE is perfluoro (ethylvinyl ether) (PPVE) and/or perfluoro (propylvinyl ether) (PMVE), MFA (copolymers of TFE/perfluoro (methylvinyl ether) (PMVE)/PAVE, where the alkyl group of the PAVE has two or more carbon atoms), and the like.

The hexafluoropropylene (HFP) units in the FEP copolymer are preferably 1 to 10 mol %, more preferably 2 to 8 mol %.

The perfluoro (alkylvinyl ether) (PAVE) units in the PFA copolymer are preferably 1 to 10 mol %, more preferably 2 to 8 mol %.

Furthermore, these copolymers can be used together as mixtures.

In order to reduce the amount of eluted metal ions and the amount of fine particles, a melt processable fluororesin where an unstable end group such as —$CF_2CH_2OH$, —$CONH_2$, —COF, and the like can be replaced with a thermally stable—$CF_3$ terminal group is preferable because the melt processable fluororesin will have fewer thermal decomposition products.

Transmittance of the Melt Processable Fluororesin Molded Article

The transmittance of the melt processable fluororesin molded article can be determined by measuring the transmittance at a wavelength of 240 to 800 nm using a UV-Vis-NIR spectrophotometer with a detector of integrating sphere/photomultiplier tube, and the transmittance calculated.

The transmittance (T) is 50% T or more, preferably 60% T or more, and more preferably 75% T or more. In addition to these transmittances, when the transmittance is 50% T or more even in the short wavelength ultraviolet region (wavelength 240 to 340 nm), the transmittance is more improved, which is preferable. On the other hand, when the transmittance at a wavelength of 240 to 800 nm is less than 50% T, the visibility of the contents (liquid amount, color) of the hot-melt fluoropolymer molded article deteriorates, which is not preferable The form of the melt processable fluororesin that is used in the present invention can be any form that is suitable for use in melt molding, such as powder, granular products of powder, particles, flakes, pellets, cubes, beads, and the like.

The melt processable fluororesin molded article of the present invention is a molded article containing 50 weight % or more, preferably 75 weight % or more, and more preferably 90 weight % or more of the melt processable fluororesin, and the remaining components can be, for example, non-melt processable fluororesin, conductive materials (carbon, graphite), and the like.

Manufacturing Method of Melt Processable Fluororesin Molded Article

The method of producing the melt processable fluororesin molded article of the present invention is not particularly limited, and molding can be performed by using a conventionally known molding method using the aforementioned melt processable fluororesin. Examples of molding methods include melt extrusion molding, injection molding, melt compression molding, transfer molding, blow molding, injection molding, rotational molding, lining molding, film molding and the like, and of these, melt extrusion molding and injection molding are preferable.

Examples of the molded article obtained by melt molding include bottles, films, tubes, sheets, pipes, fittings, gaskets, O-rings, valves, filter housings, regulators, wafer carriers, and sheet molded articles.

EXAMPLES

The present invention is described below in further detail by presenting examples and comparative examples, but these descriptions are not intended to limit the present invention.

Measurements of the physical properties of the present invention are performed by the following methods. Incidentally, the ultrapure water that is used in the following methods is ultrapure water where the specific resistivity is controlled to 18 MΩ·cm or more and the TOC (total organic carbon) is controlled to 5 ppb or less.

A. Measurement of Physical Properties (1) Amount of Eluted Cr Ions, Amount of Eluted Mo Ions, and Amount of Eluted Ni Ions that Elude from a Melt Processable Fluororesin Tube A 12% nitric acid aqueous solution is sealed in a melt processable fluororesin tube with an outer diameter of 6.35 mm, a thickness of 1.00 mm, and a length of 1 m, and after eluting for 20 hours at 60° C., the test solution is quantitatively analyzed by an ICP mass analysis method, and it is confirmed that the amount of eluted Ni ions ($pg/cm^2$), the amount of eluted Cr ions ($pg/cm^2$), and the amount of eluted Mo ions ($pg/cm^2$) satisfy the aforementioned formula (1).

(2) Concentration of Anions and Cations

It is confirmed that anions and cations are not detected by any of ion chromatography, ICP mass analysis methods, and TOF-SIMS methods. Incidentally, the definition of "not detected" in these tests is as described above.

(3) Fine Particles

Fine particles are measured by passing ultrapure water through an automatic measurement type fine particle meter specified in JIS K 0554.

Specifically, a fluororesin molded article is filled with 1% ammonia water, allowed to sit for 20 hours at room temperature, water rinsed until the pH of the water discharged from the molded article is neutral using ultrapure water with a flow rate of 1 L/minute at room temperature, and then ammonia processing is performed by drying until the water droplets on the molded article disappeared at room temperature using nitrogen gas where fine particles were removed by a 10 nm hollow thread filter. The number of fine particles in the fluororesin molded article after ammonia treatment is determined by measuring the amount of 40 to 125 nm size fine particles using UltraChem 40, manufactured by PMS, at a flow rate of 1 L/minute using ultrapure water by the method according to the measurement method (automatic measurement) of ultrafine particles in a liquid, specified in JIS K 0554. The measurement data of the in-liquid fine particle meter is obtained by continuously measuring for 1 hour at 1 minute intervals, and determining the number of fine particles in a milliliter per hour (sum of 60 measurements). The results are shown in Table 2.

Incidentally, for reference, a measurement is also performed on a fluororesin molded article using the aforementioned in-liquid fine particle measurement method without performing the aforementioned treatment using ammonia water. The results are shown in Table 2 as reference examples 1 to 3.

(4) Zeta Potential

The zeta potentials of the surface of the melt processable fluororesin molded article and of the melt processable fluororesin are calculated after measuring the flow current using a flow potential method using a SurPASS manufactured by Anton-Parr. An aqueous solution of 0.001 mol/L of KCl is used as the electrolyte solution.

(5) Melt Flow Rate (MFR)

A cylinder held at 372° C. is filled with 5 g of test material and maintained for 5 minutes using a melt indexer provided with a corrosion resistant cylinder, die, and piston (manufactured by Toyo Seiki Co., Ltd.) in accordance with ASTM D-1238-95, and then the test material is extruded through a die orifice under a load of 5 kg (piston and weight), and the extrusion rate at this time (g/10 minutes) is taken as the MFR.

(6) Melting Point (Melting Peak Temperature)

An input compensation type differential scanning calorimeter (DSC, manufactured by Perkin Elmer) is used for measuring the melting point of the melt processable fluororesin. Approximately 10 mg of the sample is weighed and placed in an aluminum pan prepared for this device, crimped with a crimper prepared for this device, then stored in a DSC main body and heated from 150° C. to 360° C. at a rate of 10° C./minute. The melting peak temperature (Tm) is determined from the melting curve obtained at this time.

(7) Transmittance

The transmittance of the a melt processable fluororesin molded article is measured using a UV-Vis-NIR spectrophotometer (U-4100, manufactured by Hitachi, Ltd.) with a detector of integrating sphere/photomultiplier tube, at a scan speed of 300 nm/min and a slit width of 6.00 nm, and then the average value was calculated to obtain the transmittance (in terms of device specification, wavelength The light source was switched at 340 nm).

B. Raw Materials

The raw materials used in the embodiments of the present invention and the comparative examples are described below.

(1) PFA (1)

Tetrafluoroethylene/perfluoroethylvinyl ether copolymer: perfluoro(ethylvinyl ether) content 4.7 mol %, melting point of 263° C., unstable terminal groups (—$CH_2OH$ terminal groups, —$CONH_2$ terminal groups, —COF terminal groups) of less than 6 groups per million carbon atoms, zeta potential of −85 mV at pH=7.

(2) PFA (2)

Tetrafluoroethylene/perfluoroproylvinyl ether copolymer: perfluoro propylvinyl ether content 1.4 mol %, melting point of 310° C., unstable terminal groups (—$CH_2OH$ terminal groups, —$CONH_2$ terminal groups, —COF terminal groups) less than 6 groups per million carbon atoms, zeta potential of −50 mV at pH=7.

Embodiments 1 to 5, Comparative Examples 1 and 2, Reference Examples 1 to 3

An undrawn tube having an outer diameter of 6.35±0.2 mm and a thickness of 1.00±0.1 mm is obtained by molding PFA (1) and (2) at the molding temperatures shown in Table 1 using an extrusion molding machine with a diameter of 30 mm. The amount of eluted Cr ions, the amount of eluted ions, the amount of eluted Ni ions, and the zeta potential are measured for the melt processable fluororesin tubes. The results are shown in Table 1.

The number of fine particles and the transparency are also measured for the tubes obtained by Examples 4 and 5 and Comparative Example 1. The results are shown in Table 2 and 3.

Reference Example 4

Figure 1:
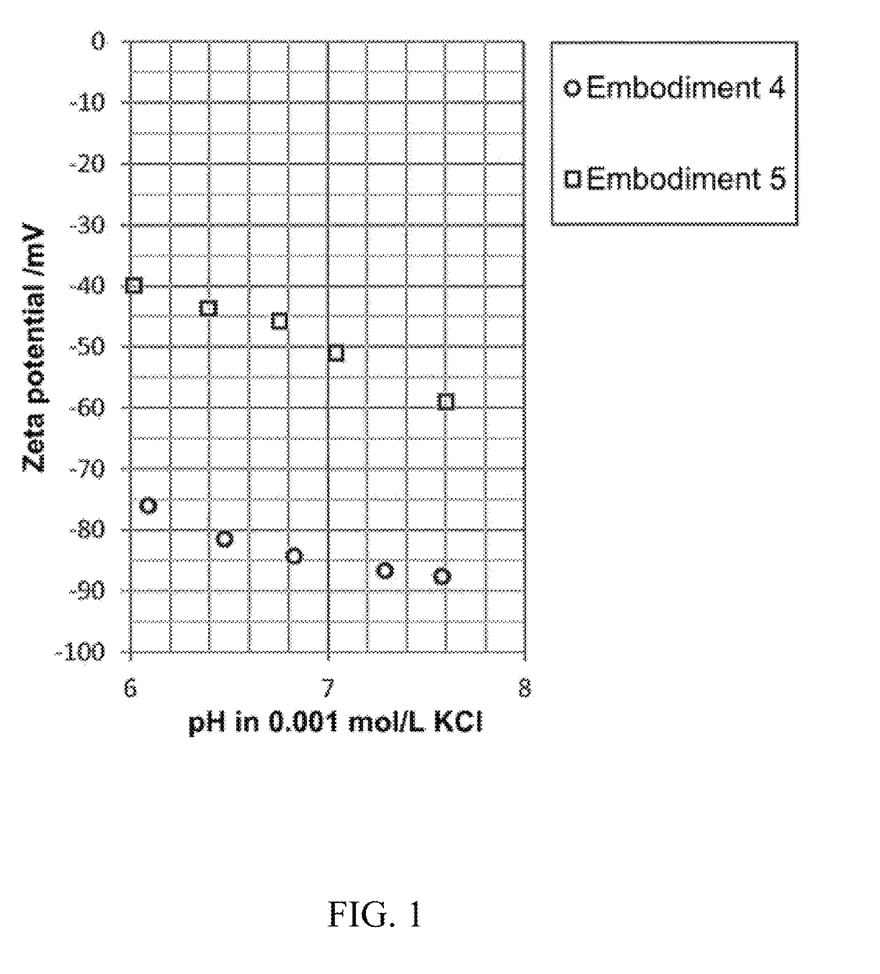
FIG. 1 shows the zeta potential of the inner surface of tube (A) obtained in Example 4 and of the tube (B) obtained in Example 5.
Figure 2:
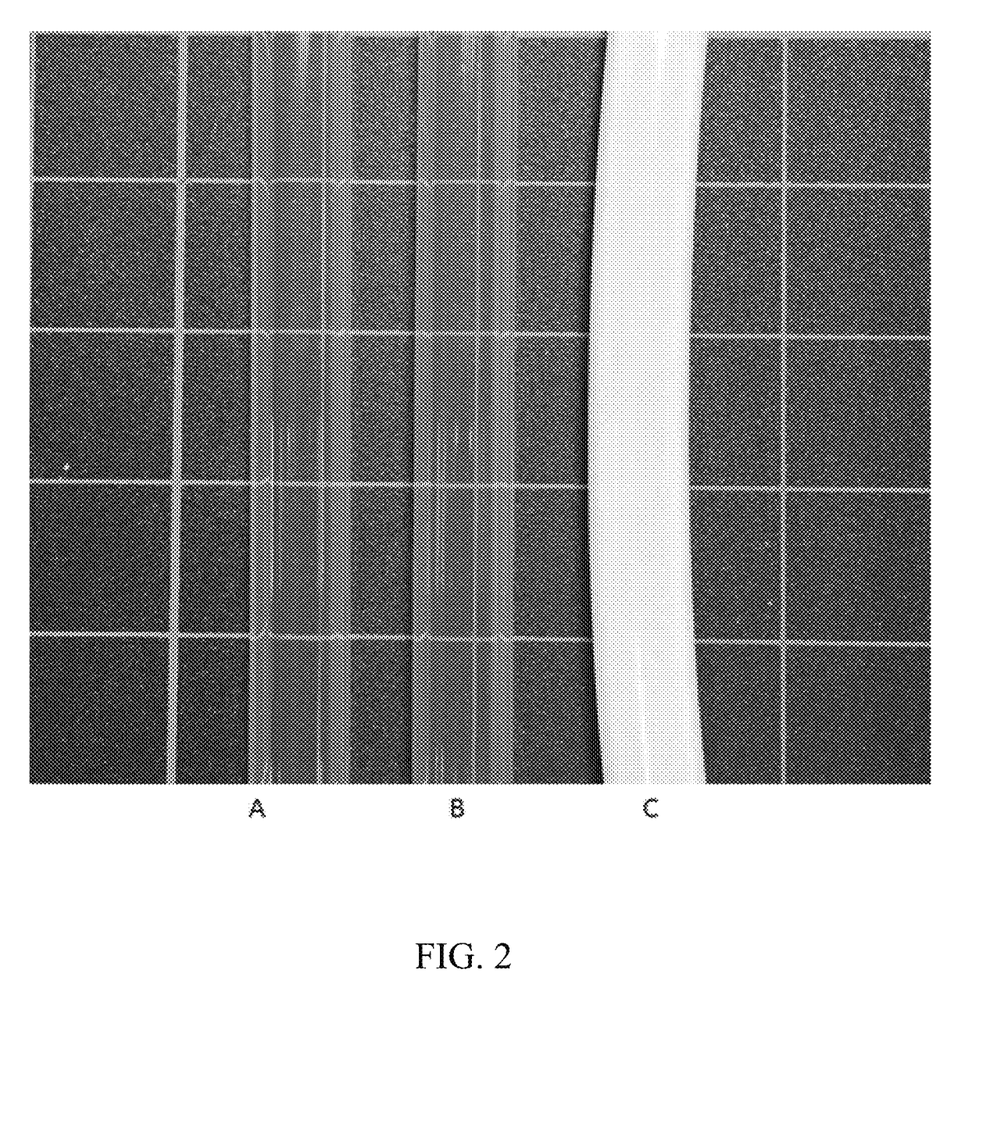
FIG. 2 shows a photograph of the tube (A) obtained by Example 4, the tube (B) obtained by Comparative Example 1, and the tube (C) obtained by reference Example 4.

The transparency is also measured for the Naflon (registered trademark) PTFE tube manufactured by Nichias Corporation. Furthermore, a graph showing the relationship between pH and the zeta potential of the inner surface of the tube (A) obtained in Example 4 the tube (B) obtained in Example 5 is shown in FIG. 1, and a photograph of the tube (A) obtained in Example 4, the tube (B) obtained in Comparative Example 1, and the tube (C) obtained in Reference 4 is shown in FIG. 2.

As can be seen from Table 1, the Examples 1 to 5 of the present invention have minimal destruction of the passivation state, and the corrosion resistance of the corrosion resistant alloy that formed the molding machine is kept sound. Furthermore, the zeta potential at pH=7 is −50 mV or less, and the number of fine particles is 5000 particles/mL or less, so it can be seen that the number of fine particles that adhered to the melt processable fluororesin molded article wetted part side surface is reduced. This indicates that there are fewer causes of defects that lead to defective semiconductor products.

Furthermore, as can be seen from the results of Table 2, the number of fine particles in Example 4 did not increase even when the melt processable fluororesin molded article is treated with ammonia. In Example 5, most of the fine particles are detected from the melt processable fluororesin molded article that is treated with ammonia, and therefore it is clear that fine particles that could not be measured by the fine particle measurement using ultrapure water remained in the melt processable fluororesin molded article, based on accelerated testing using ammonia. Furthermore, in Comparative Example 1, most of the fine particles are measured in the ultrapure water, but this indicates that the molding temperature was not appropriate. Furthermore, fine particles are reduced after treatment with ammonia in Comparative Example 1, and therefore it can be said that the fine particles that adhered to the melt processable fluororesin molded article are removed by the reactive force of the zeta potential. The foregoing results show that the sample with the fewest fine particles in the melt processable fluororesin molded article is Example 4.

Furthermore, although the number of particles is reduced in Reference Examples 1 and 2 where ammonia treatment is not performed and the measurement is performed only by passing through ultra pure water, the molding temperature in Reference Example 3 is high, so it is confirmed that there are many fine particles even after passing through the ultrapure water.

Furthermore, according to FIG. 2, PFA (1) is found to maintain transparency regardless of the molding temperature.

INDUSTRIAL APPLICABILITY

The present invention provides a melt processable fluororesin molded article with reduced metal ions (eluted metal ions) and submicron size fine particles after molding, while maintaining the excellent heat resistance, chemical resistance, mechanical properties, and the like of the melt processible fluororesin The present invention can provide a melt processable fluororesin molded article with reduced metal ions (eluted metal ions) and submicron size fine particles, without requiring a long cleaning process using a dilute solution of a surfactant, strong acid, alkali, organic solvent, ultrapure water, and the like.

Therefore, the melt processable fluororesin molded article with reduced elutable metal ions (eluted metal ions) and submicron size fine particles provided by the present invention can be suitably used in the semiconductor and semiconductor chemical fields. Furthermore, the transparency is maintained regardless of the molding temperature, so visibility of the chemical solution in the melt processable fluororesin molded article that is used in the semiconductor cleaning process or the like can be maintained.

TABLE 1

|  | Embodiment 1 PFA(1) | Embodiment 2 PFA(1) | Embodiment 3 PFA(1) | Embodiment 4 PFA(1) | Embodiment 5 PFA(2) | Comparative example 1 PFA(1) | Comparative example 2 PFA(2) |
|---|---|---|---|---|---|---|---|
| Molding (° C.) temperature | 310 | 315 | 320 | 330 | 360 | 360 | 380 |
| Amount of eluted Ni ions (pg/cm$^2$) | 627 | 1,060 | 1,133 | 631 | 3,014 | 441 | 8,533 |
| Amount of eluted Cr ions (pg/cm$^2$) | 149 | 257 | 287 | 159 | 838 | 151 | 2,105 |
| Amount of eluted Mo ions (pg/cm$^2$) | 53 | 94 | 101 | 144 | 119 | 3,517 | 12,428 |
| Value from Equation (1) | 0.76 | 0.75 | 0.74 | 0.68 | 0.76 | 0.11 | 0.37 |
| Zeta potential (mV) at pH = 7 | −85 | −85 | −85 | −85 | −50 | −85 | −50 |

TABLE 2

|  | Embodiment 4 PFA(1) | Embodiment 5 PFA(2) | Comparative example 1 PFA(1) | Reference example 1 PFA(1) | Reference example 2 PFA(2) | Reference example 3 PFA(1) |
|---|---|---|---|---|---|---|
| Molding temperature (° C.) | 330 | 360 | 360 | 330 | 360 | 360 |
| Ammonia treatment | Yes | Yes | Yes | No | No | No |
| Fine particle measurement medium | Ultrapure water | Ultrapure water | Ultrapure water | Ultrapure water | Ultrapure water | Ultrapure water |
| Total sum of fine particles measured in 1 hour (qty/mL) | 100 | 4558 | 385 | 71 | 97 | 729 |

TABLE 3

|  |  | Embodiment 4 PFA(1) | Embodiment 5 PFA(2) | Comparative example 1 PFA(1) | Reference example 4 PTFE |
|---|---|---|---|---|---|
| Molding temperature | (° C.) | 330 | 360 | 360 | 360 |
| Wavelength 240~800 nm transmittance | (%) | 75 | 66 | 75 | 43 |
| wavelength 240~340 nm transmittance | (%) | 56 | 42 | 56 | 23 |

What is claimed is:

1. A melt processible fluororesin molded article, wherein an amount of eluted Ni ions in pg/cm$^2$ and an amount of eluted Cr ions in pg/cm$^2$ and an amount of eluted Mo ions in pg/cm$^2$ in a test solution after eluting for 20 hours at 60° C. using 12% nitric acid, quantitatively analyzed by an induced coupled plasma mass analysis method, satisfy the following formula:

$$0.68 \leq 1-[(M_1+M_2)/(M_1+M_2+M_3)]<0.76,$$

wherein $M_1$ refers to the eluted Cr ion amount in pg/cm$^2$, $M_2$ refers to the eluted Mo ion amount in pg/cm$^2$, and $M_3$ refers to the eluted Ni ion amount in pg/cm$^2$, wherein the melt processible fluororesin molded article is formed from a melt processible fluororesin comprising a copolymer comprising tetrafluoroethylene and 2 to 8 mol % perfluoro(ethylvinyl ether), the melt processible fluororesin having a form selected from the group consisting of a pellet, a cube, and a bead prior to melt molding, wherein the melt processible fluororesin is melt molded to form the melt processible fluororesin molded article, wherein the amount of eluted Mo ions measured by the induced coupled plasma mass analysis method is 53 to 144 pg/cm$^3$, the amount of eluted Cr ions measured by the induced coupled plasma mass analysis method is 149 to 838 pg/cm$^3$, and the amount of eluted Ni ions measured by the induced coupled plasma mass analysis method is 627 to 3,014 pg/cm$^3$, wherein the melt processible fluororesin molded article comprises fine particles measured by passing ultrapure water through an automatic measurement fine particle meter as specified in JIS K 0554 in an amount such that a total of 0 to 100 particles/mL are detected as measured by a fine particle in liquid measurement method as a sum of measurements for 1 hour, and wherein a zeta potential of a surface of the melt processible fluororesin molded article measured by a flow potential method is −50 mV or lower.

2. The melt processible fluororesin molded article according to claim 1, wherein anions and cations are not detected by any of an ion chromatography method, the induced coupled plasma mass analysis method, and a time of flight-secondary ion mass spectrometry method.

3. The melt processible fluororesin molded article according to claim 1, wherein a zeta potential measured by a flow potential method of the melt processible fluororesin is −50 mV or lower.

4. The melt processible fluororesin molded article according to claim 1, wherein the melt processible fluororesin is having a melt flow rate (MFR) when measured at a measurement temperature of 372° C. and a load of 5 kg of 1 to 100 g/10 minutes.

5. The melt processible fluororesin molded article according to claim 1, wherein the melt processible fluororesin molded article is having transmittance of 50% T or more at a wavelength of 240-800 nm.

6. The melt processible fluororesin molded article according to claim 1, wherein the melt processible fluororesin molded article is having transmittance of 60% T or more at a wavelength of 240-800 nm.

7. The melt processible fluororesin molded article according to claim 1, wherein the melt processible fluororesin molded article is having transmittance of 75% T or more at a wavelength of 240-800 nm.

8. The melt processible fluororesin molded article according to claim 1, wherein the melt processible fluororesin molded article is having transmittance of 50% T or more at a wavelength of 240-340 nm.

9. The melt processible fluororesin molded article according to claim 1, wherein the melt processible fluororesin molded article is a molded article selected from the group consisting of a tube, a pipe, a bottle, a fitting, a gasket, an O-ring, a valve, a filter housing, a wafer carrier, and a sheet molded article.

10. The melt processible fluororesin molded article according to claim 1, wherein the melt processible fluororesin molded article is a gasket.

11. The melt processible fluororesin molded article according to claim 1, wherein the melt processible fluororesin molded article is an O-ring.

12. The melt processible fluororesin molded article according to claim 1, wherein the melt processible fluororesin molded article is a filter housing.

13. The melt processible fluororesin molded article according to claim 1, wherein the melt processible fluororesin molded article is a regulator for a semiconductor manufacturing device.

14. The melt processible fluororesin molded article according to claim 1, wherein the melt processible fluororesin molded article is a wafer carrier.

* * * * *